Nov. 28, 1939.   W. F. BOLDT   2,181,721
MOUNTING FOR BRAKE SHOES
Filed Jan. 14, 1938
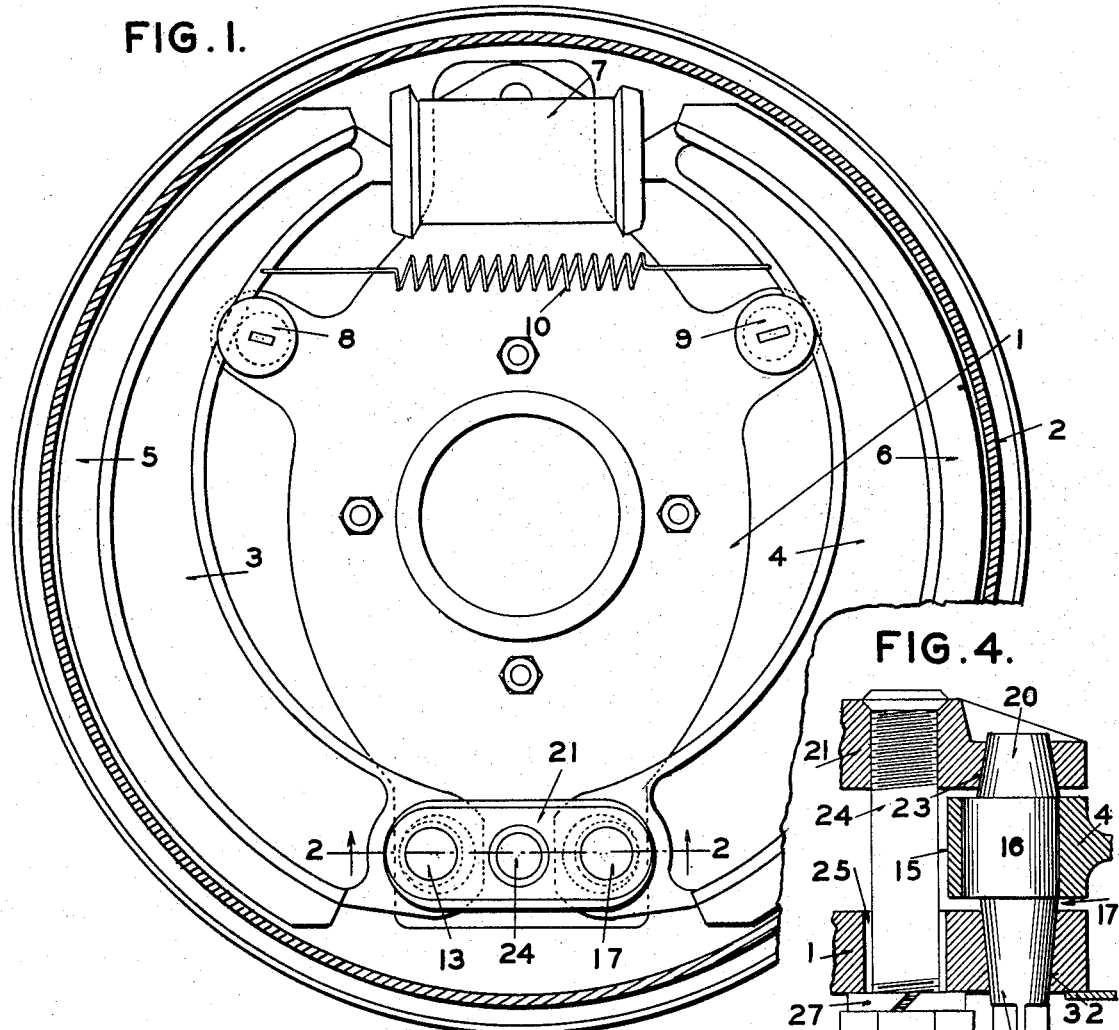
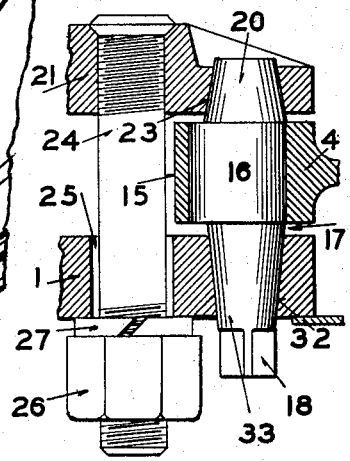
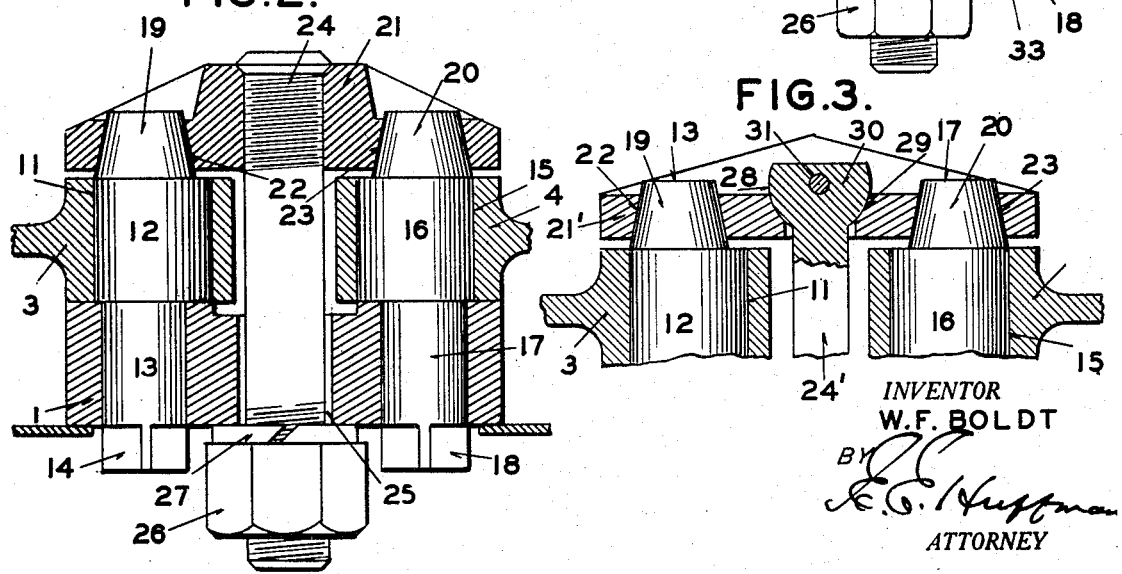
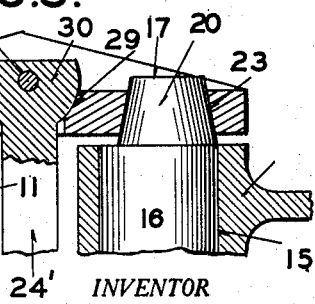
INVENTOR
W. F. BOLDT
ATTORNEY Patented Nov. 28, 1939

2,181,721

UNITED STATES PATENT OFFICE 2,181,721

MOUNTING FOR BRAKE SHOES

Werner F. Boldt, Overland, Mo., assignor to Wagner Electric Corporation, St. Louis, Mo., a corporation of Delaware Application January 14, 1938, Serial No. 184,942

15 Claims. (Cl. 188—79.5)

My invention relates to brakes and more particularly to the mounting of brake shoes on a support.

One of the objects of my invention is to provide improved means for mounting a brake shoe on a support, which mounting means forms the anchor for the shoe and also permits adjustment of the shoe to properly position the shoe with respect to the drum with which it cooperates.

Another object of my invention is to provide improved means for locking an adjustable anchor pin for a brake shoe in adjusted position, the locking means being so associated with the pin that it can be operated to lock the pin without disturbing a desired adjustment thereof.

Still another object of my invention is to so construct a double anchor pin mounting for the adjacent ends of a pair of brake shoes that both anchor pins will take the reaction of each brake shoe during braking and which will permit the anchor pins to be individually adjusted.

Other objects of my invention will become apparent from the following description taken in connection with the accompanying drawing in which Figure 1 is a side view of a brake assembly embodying my invention; Figure 2 is a cross-sectional view taken on the line 2—2 of Figure 1 showing my improved mounting for the brake shoes; Figure 3 is a cross-sectional view of a modification; and Figure 4 is a cross-sectional view showing another modification.

Referring to the drawing in detail, numeral 1 indicates a support or backing plate secured to a fixed part of the vehicle, as for example, the axle support, and 2 a brake drum secured to the vehicle wheel and being closed at its open side by the backing plate. Within the drum are brake shoes 3 and 4 which are provided with linings 5 and 6 for cooperation with the drum surface. The shoes are adapted to be actuated into engagement with the drum by the fluid motor 7 positioned between the upper adjacent ends of the shoes and the shoes are adapted to be maintained in their normally retracted position against the adjustable stops 8 and 9 by means of the coil spring 10.

The lower ends of the shoes are positioned adjacent each other and are mounted on the backing plate 1 by my novel shoe mounting means. The shoe 3 is formed with an opening 11 for receiving the integral eccentric bearing portion 12 of an anchor pin 13 mounted on the backing plate and having one end extending to the exterior and provided with a suitable wrench receiving portion 14. Similarly, the shoe 4 is formed with an opening 15 for receiving the integral eccentric bearing portion 16 of an anchor pin 17 mounted on the backing plate and having one end extending to the exterior and provided with a wrench receiving portion 18.

The inner end of pin 13 is formed with a conical surface 19 having its axis coinciding with the axis of pin 13 and the inner end of pin 17 is formed with a conical surface 20 having its axis coinciding with the axis of pin 17. A connecting member or plate 21 extends between the inner ends of the pins and is formed with conical openings 22 and 23 for receiving the conical ends 19 and 20 of the pins. The central part of the connecting member 21 has secured thereto a bolt 24 which extends between the ends of the shoes 3 and 4 and out through an opening 25 in the backing plate to the exterior thereof. The outer end of this bolt is provided with a nut 26 and a lock washer 27 for drawing member 21 toward the backing plate. The bolt 24 is secured to member 21 by means of threads and the end of the bolt is peened over in order to prevent relative rotation between the bolt and the member.

When it is desired to adjust the lower ends of the shoes in order to properly position the lining thereof with respect to the drum when the shoes are in "off" position, nut 26 of bolt 24 is loosened and the connecting member 21 freed from tight engagement with the conical ends of the pins by a slight tap on the outer end of the bolt. Either pin 13 or 17 or both of them may now be adjusted as desired from the exterior of the plate by means of a suitable wrench. By rotating pin 13 or 17 in the proper direction, the eccentric portion will move the end of the shoe to the desired position. After the adjustment has been made, nut 26 is screwed up tight, thus causing the connecting member 21 to move toward the backing plate and bring the cooperating conical surfaces on the pins and the connecting member into tight frictional engagement and also force the eccentric portions of the pins against the backing plate, thereby locking the pins in their adjusted positions.

From the foregoing it is thus seen that the anchor pins may be readily adjusted by simply loosening the nut 26 of bolt 24. The construction is such that after adjustment has been made, there is no possibility of disturbing this adjustment when the pins are locked in their adjusted position by screwing up nut 26 as would be the case where a locking nut is employed on the outer end of pins 13 and 17 as has been the prior practice. The connecting member 21, which serves to lock the pins in their adjusted position, also functions as a force transmitting member between the inner ends of pins 13 and 17 when the connecting member is in locked position. This is a very important feature of the construction since it forms with the backing plate and pins a "box" type of mounting for the shoes, thus producing a very strong and rigid construction. Due to the force transmitting function of member 21, the torque reaction which is taken by either of the pins during operation of the brake will also be partially transmitted to the other pin, thus in effect providing two anchor pins for each shoe.

In Figure 3 there is shown a slight modification of the manner in which the bolt is connected to the connecting member. In the particular construction shown the connecting member 21' is formed with a semi-spherical surface 28 for co-operation with a similar surface 29 on the head 30 of the bolt 24' which is employed to force the member 21' toward the backing plate and thus lock the anchor pins. A pin 31 extends through the head 30 for preventing rotation of bolt 24' relative to the connecting member 21' during the tightening and loosening of nut 26 on the outer end of the bolt. The operation of the modification is similar to the one previously described with the exception that the connection between the head of bolt 24' and the connecting member 21' permits them to have some relative movement, thereby believing this connection of any strain which may be present due to slight inaccuracies in manufacture.

As shown in Figure 4, additional cooperating conical surfaces may be provided if it is desired to secure a greater holding effect on the anchor pin. The pin 17 is the only one shown but it is to be understood that the other pin 13 may be similarly constructed. The opening in the support 1 which receives pin 17 is formed with a conical surface 32 and the portion of the pin which extends therethrough is formed with a cooperating conical surface 33. It is thus seen that when nut 26 is screwed up, member 21 will force the cooperating conical surfaces 20 and 23 and the cooperating surfaces 32 and 33 into tight frictional engagement, thus holding the pin in adjusted position.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, a support, a brake friction element, a rotatable anchor pin carried by the support and provided with an eccentric portion cooperating with the friction element for adjusting purposes, and means for clamping the pin in an adjusted position and comprising a member engaging one end of the anchor pin and a second member independent of the anchor pin and cooperating with the support at a point adjacent the anchor pin for causing said first named member to be drawn toward the support to clamp the pin to the support.

2. In braking mechanism, a support, a brake shoe, a rotatable anchor pin for the shoe carried by the support, said pin being provided with an inclined surface, a member provided with an inclined surface for cooperating with the inclined surface on the pin, and means adjacent and independent of the anchor pin and cooperating with the support for forcing the inclined surfaces into tight frictional engagement.

3. In braking mechanism, a support, a brake shoe, a rotatable anchor pin for the shoe and carried by the support, means including a conical surface on the pin and a cooperating non-rotatable conical surface for holding the pin in adjusted position, means having a part cooperating with the pin and another part carried by the support adjacent the pin, and means cooperating with the last named part and the support for causing the first part to force the cooperating conical surfaces into tight frictional engagement.

4. In braking mechanism, a support, a brake shoe, a rotatable anchor pin for the shoe carried by the support, one end of said pin being provided with a conical surface, a member provided with a conical opening for receiving the conical end of the pin, and means mounted on the support at a point adjacent the anchor pin for forcing the surface of the conical opening into tight engagement with the conical surface on the end of the pin.

5. In braking mechanism, a support, a brake shoe, a rotatable anchor pin mounted on the support and provided with an eccentric portion for engaging the shoe, and means cooperating with the end of the pin remote from the support for forcing the eccentric portion into tight frictional engagement with the support, said means having a portion carried by and cooperating with the support at a point adjacent the anchor pin.

6. In braking mechanism, a support, a brake shoe, a rotatable anchor pin mounted on the support and provided with an eccentric portion for engaging the shoe, the end of the pin remote from the support being provided with a conical surface, a member provided with a conical surface for cooperating with the conical end of the pin, and means independent of the pin for forcing the conical surfaces into tight frictional engagement and for clamping the eccentric portion to the support.

7. In braking mechanism, a support, a brake shoe, a rotatable anchor pin for the shoe carried by the support, said support being provided with a conical opening for receiving the anchor pin and said pin being provided with a conical surface for cooperating with the surface of the conical opening, and means carried by the support at a point adjacent the anchor pin for forcing the cooperating conical surfaces into tight frictional engagement.

8. In braking mechanism, a support, a brake shoe, a rotatable anchor pin for the shoe carried by the support, said support being provided with a conical opening for receiving the anchor pin and said pin being provided with a conical surface for cooperating with the surface of the conical opening, means forming a conical surface on the end of the pin remote from the support, a member provided with a conical opening for receiving the conical end of the pin, and means cooperating with the support at a point adjacent the anchor pin for forcing said member toward the support and the cooperating conical surfaces into tight frictional engagement.

9. In braking mechanism, a supporting member, a brake shoe provided with an opening, a rotatable anchor pin carried by the support and provided with an integral eccentric portion positioned in the shoe opening, the end of said pin on the side of the shoe opposite the supporting member being provided with a conical surface, a member having a conical opening cooperating with the conical surface on the end of the pin, and bolt means engaging the member and extending through the supporting member adjacent the pin and cooperating with the support for forcing the member onto the end of the pin and clamping the pin against rotation relatively to the supporting member.

10. In braking mechanism, a support, two brake shoes having adjacently positioned ends, spaced anchor pins mounted on the support and each adapted to cooperate with a shoe, and means comprising a separable rigid member connecting the ends of the pins remote from the support and cooperating with said ends by a wedging action to thus prevent any relative movement between said pins and said member whereby any force transmitted to one pin will be directly transmitted to the other pin.

11. In braking mechanism, a support, two brake shoes having adjacently positioned ends, spaced anchor pins carried by the support for the brake shoe ends, each anchor being provided with a portion engaging a shoe and also having a portion extending to the exterior of the support, a member provided with means for engaging the inner ends of the pins and preventing the pins from rotating, and means cooperating with the member and extending through the support between the anchor pins for causing said member to prevent the pins from rotating.

12. In braking mechanism, a support, two brake shoes having adjacently positioned ends, spaced anchor pins mounted on the support and each extending through an opening in the end of a shoe, a member extending between the ends of said pins remote from the support, said member and the end of each of the pins being provided with cooperating inclined surfaces, and means for forcing said surfaces into tight engagement with each other to thereby cause said member to form a rigid connection between the ends of the pins and prevent their relative movement.

13. In braking mechanism, a support, two brake shoes having adjacently positioned ends, spaced anchor pins mounted on the support and each adapted to be engaged by a shoe, the inner ends of each of said pins being provided with a conical surface, a member extending between the inner ends of the pins and being provided with conical openings for receiving the conical ends of the pins, and means for forcing the member onto the ends of the pins and clamping the pin to the support.

14. In braking mechanism, a support, two brake shoes having adjacently positioned ends, spaced rotatable anchor pins mounted on the support and each adapted to engage a shoe, the inner ends of each of said pins being provided with a conical surface, a member extending between the inner ends of the pins and being provided with conical openings for receiving the conical ends of the pins, and bolt means extending through the support and cooperating with the member and the support for forcing the member onto the ends of the pins and clamping the pins to the support.

15. In braking mechanism, a support, two brake shoes having adjacently positioned ends, spaced anchor pins mounted on the support and each adapted to be engaged by a shoe, the inner ends of each of said pins being provided with a conical surface, a member extending between the inner ends of the pins and being provided with conical openings for receiving the conical ends of the pins, and means cooperating with the member and extending through the support for forcing the member onto the ends of the pins, said means comprising a bolt having a swivel connection with the member.

WERNER F. BOLDT.